US008689244B2

(12) United States Patent
Beckwith et al.

(10) Patent No.: US 8,689,244 B2
(45) Date of Patent: Apr. 1, 2014

(54) HARDWARE COMMUNICATIONS INFRASTRUCTURE SUPPORTING LOCATION TRANSPARENCY AND DYNAMIC PARTIAL RECONFIGURATION

(75) Inventors: William Beckwith, Great Falls, VA (US); Steven Deller, Arnold, MD (US); Joe G. Thompson, Manchester, NH (US)

(73) Assignee: Objective Interface Systems, Inc., Herndon, VA (US)

( * ) Notice: Subject to any disclaimer, the term of this patent is extended or adjusted under 35 U.S.C. 154(b) by 1507 days.

(21) Appl. No.: 12/010,516

(22) Filed: Jan. 25, 2008

(65) Prior Publication Data

US 2008/0229326 A1 Sep. 18, 2008

Related U.S. Application Data

(60) Provisional application No. 60/897,497, filed on Jan. 26, 2007.

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06G 7/64 | (2006.01) |
| H03K 17/00 | (2006.01) |
| H03H 11/40 | (2006.01) |
| H03K 17/687 | (2006.01) |
| G06F 15/16 | (2006.01) |

(52) U.S. Cl.
USPC ........... 719/330; 719/313; 719/327; 327/334; 327/365; 327/524; 327/603; 709/250; 709/253

(58) Field of Classification Search
None
See application file for complete search history.

(56) References Cited

U.S. PATENT DOCUMENTS

| 7,088,727 | B1 | 8/2006 | Short et al. |
| 2002/0026630 | A1 | 2/2002 | Schmidt et al. |
| 2003/0093396 | A1* | 5/2003 | Hathaway .......................... 707/1 |
| 2005/0108382 | A1 | 5/2005 | Murotake et al. |
| 2005/0262512 | A1 | 11/2005 | Schmidt et al. |
| 2006/0015674 | A1 | 1/2006 | Murotake |
| 2006/0041889 | A1* | 2/2006 | Radulescu et al. ............ 719/313 |

(Continued)

OTHER PUBLICATIONS

Supplementary European Search Report dated Jan. 11, 2011, issued in related application EP 08 72 4856.

(Continued)

*Primary Examiner* — H S Sough
*Assistant Examiner* — Craig Dorais
(74) *Attorney, Agent, or Firm* — Venable LLP; Robert S. Babayi

(57) ABSTRACT

A communication system according to one aspect of the present invention, comprises one or more integrated circuits. The one or more integrated circuits comprise at least one of a local integrated circuit and a remote integrated circuit. At least one sending application hardware module located on the local integrated circuit has a sending logic that controls the sending of messages from the sending application hardware module. At least one receiving application hardware module is located on at least one of the local integrated circuit or remote integrated circuit. A sending application hardware module sends messages to a receiving application hardware module without its sending logic having been constructed with a priori knowledge of the address of or the path to said receiving application hardware module. A dispatch logic located on the local integrated circuit that routes at least one or more.

15 Claims, 11 Drawing Sheets

(56) References Cited

U.S. PATENT DOCUMENTS

| | | |
|---|---|---|
| 2006/0085498 A1 | 4/2006 | Matsushima |
| 2006/0150188 A1 | 7/2006 | Roman et al. |
| 2008/0235712 A1* | 9/2008 | Reed et al. .................. 719/328 |

OTHER PUBLICATIONS

Yau, S.S. et al., "Reconfigurable Context-Sensitive Middleware for ADS Applications in Mobile Ad Hoc Network Environments," Proceedings 5th International Symposium on Autonomous Decentralized Systems, IEEE Comput. Soc., Los Alamitos, CA, 2001, pp. 319-326.

Paulin, P.G. et al., "Application of a Multi-Processor SoC Platform to High-Speed Packet Forwarding," Proceedings. Design, Automation and Test in Europe Conference and Exhibition IEEE Comput. Soc. Los Alamitos, CA, USA, vol. 3, 2004, pp. 58-63.

International Search Report and Written Opinion dated Jun. 24, 2008, directed to PCT/US08/01075 application. (11 pages).

Australian Office Action issued Aug. 27, 2010 in related application No. AU 2008211278.

* cited by examiner

| BIT | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| FUNC | | | | DESTINATION OBJECT ADDRESS | | | | | | | SOURCE OBJECT ADDRESS | | | | |
| BIT | 15 | 14 | 13 | 12 | 11 | 10 | 9 | 8 | 7 | 6 | 5 | 4 | 3 | 2 | 1 | 0 |
| FUNC | | | SOURCE OBJECT ADDRESS | | | | BO | MT | RE | rsv | | | ENUMERATED OPERATION | | | |

REQUEST_CONTROL MESSAGE FIELD

FIG.8a

| BIT | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| FUNC | | | | DESTINATION OBJECT ADDRESS | | | | | | | SOURCE OBJECT ADDRESS | | | | |
| BIT | 15 | 14 | 13 | 12 | 11 | 10 | 9 | 8 | 7 | 6 | 5 | 4 | 3 | 2 | 1 | 0 |
| FUNC | | | SOURCE OBJECT ADDRESS | | | | BO | MT | | RESERVED | | | | | REPLY STATUS | |

REPLY_CONTROL MESSAGE FIELD

FIG.8b

HARDWARE COMMUNICATIONS INFRASTRUCTURE SUPPORTING LOCATION TRANSPARENCY AND DYNAMIC PARTIAL RECONFIGURATION

CROSS REFERENCE TO RELATED APPLICATIONS

This application claims priority of U.S. Provisional Application No. 60/897,497, (filed on Jan. 26, 2007) the entire contents of which are incorporated herein by reference.

FIELD OF INVENTION

The present invention relates generally to implementing a digital integrated circuit device within a communications network, and more particularly, to implementing an Object Request Broker (ORB) module on a digital integrated circuit device to enable communication with other computing devices within a distributed system.

BACKGROUND OF THE INVENTION

Distributed computing is a type of parallel processing in which different components of an application, i.e. software programs or hardware modules processing logic, run simultaneously on two or more computing device that communicate with each other over a network. An application component may make an invocation, communication, or call to another component running on a different computing device, requesting a certain function to be performed or certain data to be returned. These application components may operate in different computing environments, e.g. different hardware platforms, operating systems, and programming languages. For example, two software programs within a distributed application may be written in different programming language and executed on different operating systems running on different processors. It is often difficult for a developer to implement a call directly from one such application component to another if the two components are designed and operated within different and incompatible computing environments. Therefore, there must be a common communication medium to allow these application components to interoperate and interact with one another.

In a conventional distributed system processing a distributed application software, a middleware component referred to as an Object Request Broker (ORB) is used to enable software programs operating within different computing environments to communicate with one another over a network. An ORB transforms data structures from one computing platform to a sequence of bytes which can be transmitted over the network and received by another computing platform. At the receiving computing platform, the ORB transforms the sequence of bytes to data-structures understood by the receiving computing platform. The ORB also provides transparency to the programs running within the distributed system, so that a program resident on a computing platform within the ORB can communicate with another program resident on a remote computing platform, without needing to know the location of the program, the type of platform where the program is executed, or operating system that executes the program.

ORBs communicate with each other via an abstract protocol referred to the General Inter-ORB Protocol (GIOP). The GIOP defines the format of data and syntax of messages transported through the network. The standards associated with the GIOP are maintained by the Object Management Group (OMG). The OMG also defines an architectural model of a distributed system referred to as the Common Object Request Broker Architecture (CORBA). For every application component within the distributed system, CORBA creates a bundle containing information about the capabilities of the logic inside and how to invoke it. CORBA uses an Interface Definition Language (IDL) to describe the interfaces that objects present to the world. The IDL describe an interface in a language-neutral way, so that software components that do not share a common programming language or compilation platform can communicate with one another. CORBA also defines a mapping for different programming languages such as Ada, C, C++, or Java, to communicate with the IDL.

A simplified model of a CORBA system is discussed with reference to FIG. 1. In this figure, the network 110 delivers a request from a client computer 120 to a server computer 130. An ORB Repository (not shown) stores a list of all objects, such as object X, available for execution on all computers on the network 110. The Client ORB 110 may access the ORB Repository and provides the client computer 120 with information about all objects, such as object X, executable through the ORB. In this example, the object X includes a method "fire". Although the object X is stored in and is executed by the server computer 130, that code is completely transparent to program 122 on the client computer 120. The program 122 need not know the programming language used by the program 132 or the operating system running on the server computer 130. Thus, from the perspective of the program 122, it makes a call to object X the same way as it would call any local object.

The program 122 may invoke the object X to perform the method "fire" by sending this request to client ORB 124, which provides an interface for object X to the computer 120. The client ORB 124 uses the IDL stubs 126, which are pre-compiled from IDL and define how the client computer 120 can invoke the object X on server computer 130. There is an IDL stub for each interface that the client computer 120 uses on another computer on the network 110. The client ORB 124 includes code to perform marshalling, meaning it encodes the operation and its parameters into flattened GIOP message format that is can send through the network 110 to the server computer 130.

At the server computer 130, the IDL skeletons 134 provide the static interfaces to each service exported by the server. These skeletons, like the stubs on the client computer 120, are created using an IDL compiler. Using these skeletons, the server ORB 134 transforms the flattened GIOP messages into operations and parameters understood by the object X in the sever computer 130. Thereafter, the object X executes the desired operation and, if necessary, returns the requested data back to the client computer 120 through the ORB.

Conventional ORB models have been in use in distributed software systems for years. In recent years, ORB software has been developed that can run on a microcontroller or a digital signal processor (DSP). An application may, however, be developed directly as a hardware component such an Application-Specific Integrated Circuit (ASIC)— an integrated circuit customized for the particular purposes of the application. Alternatively, an application may be implemented in a programmable logic device that does not implement a fixed function, but instead consists of a sea of logic gates and connection resources that can be configured to perform a desired function.

A popular programmable semiconductor device used today is a Field Programmable Gate Array (FPGA), which is a device containing programmable logic components and programmable interconnects. The logic and interconnect components of the FPGA can be programmed by a logic designer to perform a desired functionality. An FPGA is slower than its ASIC counterpart, consumes more power, and may be unfit for very complex applications. However, an FPGA provides certain advantages over an ASIC, which include the ability to reprogram at will, a shorter time to market, the ability to fix bugs, and lower Non-Recurring Engineering (NRE) costs.

In order for hardware components such as ASICs, PLDs, and FPGAs to be effectively incorporated into a distributed system, they need to be equipped with an ORB interface capable of transforming software requests into signals understood by the hardware components. Likewise, the hardware must be capable of generating requests understood by the software components. A conventional method of connecting hardware device to distributed system is through a custom proxy operating on a General Purpose Processor (GPP) or a Digital Signal Processor (DSP) that provides an interface between the hardware device and a software-implemented ORB. This approach has the significant disadvantage of creating a performance bottleneck in the GPP proxy.

Alternatively, the hardware designers may implement a custom application-specific ORB module within the hardware device. However, this method requires hardware designers to understand CORBA as well as Object Oriented Programming—areas that many hardware designers are not familiar with. Also, an ORB module custom-designed for a particular application block may not be readily reusable, since code mapping would have to be embedded within the module for the particular application.

U.S. Patent Application No. 2005/0108382 to Murotake et al. discusses implementing an ORB on an FPGA within a Reconfigurable Communications Architecture (RCA) radio system. This publication, however, does not disclose how an ORB is to be implemented.

An Integrated Circuit ORB (ICO), developed by PrismTech Ltd., offers an embedded ORB written in portable VHDL that can be mapped onto on an FPGA. The ICO consist of an ICO engine, an IDL to VHDL code generator, the Spectra Modeling Tool, and the SCA (Software Communication Architecture) component. The SCA is an architecture framework that defines how hardware and software elements communicate within a software defined radio. An ICO engine is responsible for implementing the transfer syntax used by CORBA. The engine demarshals the incoming GIOP messages and extracts header and data fields from the messages. For the incoming messages, the engine performs operation name demultiplexing to determine which object the data in the GIOP message is being transferred to. Message data is then extracted by the engine to transfer to the appropriate FPGA logic block. If a reply is requested, the engine will perform a read operation to an object to obtain the necessary data for the reply. It also populates the header field and builds a reply message to in compliance with the GIOP standard.

Although the ICO allows for FPGA applications to communicate through an ORB, there exists a need to provide a better mechanism for allowing hardware implemented applications to communicate with each other in a more robust fashion.

Moreover, the ICO presents a disadvantage for FPGA developers. In the ICO, the ICO engine must know of the location and functions of each application module in order to extract the appropriate header from the messages and perform operation name demultiplexing and data routing to the appropriate objects. The ICO IDL-to-VHDL code generator generates configuration parameters needed by the ICO engine. This code generator also adds these parameters to VHDL package files that configure the physical aspects of the ICO interface and internal storage elements. Therefore, parts of the VHDL code for the ICO's ORB core are generated at compile time by the code generator. As a result, if the FPGA designer wishes to reconfigure the functionality of an application block within the FPGA, the entire ORB module must be also be reconfigured and regenerated. This may be problematic to many FPGA designers in that it precludes the ability to partially reconfigure the FPGA without affecting the operation of the ORB and other FPGA modules.

SUMMARY OF THE INVENTION

Briefly, a communication system according to one aspect of the present invention, comprises one or more integrated circuits. The one or more integrated circuits comprise at least one of a local integrated circuit and a remote integrated circuit. At least one sending application hardware module located on the local integrated circuit has a sending logic that controls the sending of messages from the sending application hardware module. At least one receiving application hardware module is located on at least one of the local integrated circuit or remote integrated circuit. A sending application hardware module sends messages to a receiving application hardware module without its sending logic having been constructed with a priori knowledge of the address of or the path to said receiving application hardware module. A dispatch logic located on the local integrated circuit that routes at least one or more of:
  A) messages transmitted from the sending application hardware module on to one or more receiving application hardware modules on the local integrated circuit, or
  B) messages transmitted from the sending application hardware module for transport to one or more receiving application hardware modules located on a remote integrated circuit.

According to some of the more detailed features of this aspect of the invention, the communication system of further included one or more processors remote to the local integrated circuit running one or more receiving application software programs. A sending application hardware module in the local integrated circuit sends messages to a receiving application software program executed on a remote processor without its sending logic having been constructed with a priori knowledge of the address of or the path to said receiving application software program, and wherein the dispatch logic routes at least one or more of the messages transmitted from the sending application hardware module for transport to the receiving application software program.

According to another aspect of the invention, an integrated circuit comprises a plurality of middleware-enabled application blocks. Each middleware-enabled application block comprise one or more application modules that contain one or more application objects and use one or more application-specific interface indicators for processing messages. A transmit operation adapter associated with each middleware application block transmits one or more outbound operation names and object indicators, and a receive operation adapter associated with each middleware application block receives inbound operation names and object indicators. Each receive operation adapter of a middleware-enabled application block converts at least one inbound operation name based on the inbound object indicator to a corresponding application-specific operation indicator for use by an application object of a corresponding application module specified by the object indicator. Each transmit operation adapter of a middleware-enabled application block converts at least one application-specific operation indicator specified by an application object of a corresponding application module to a corresponding outbound operation name. An operation name from a transmit operation adapter in one application block is conveyed to a receive operation adapter of another application block based on an object indicator from said transmit operation adapter. This aspect of the present invention allows for partial reconfigurability of an FPGA that implements the application blocks such that each application block can be reconfigured without impaction any other application block.

According to some of the more detailed features of this aspect of the invention, a message router conveys one or more messages each containing an optional operation name, an optional object indicator, and other data from the plurality of middleware-enabled application blocks and directs one or more outbound operation names and object indicators to the plurality of the middleware-enabled application blocks. A dispatch module coupled to the message router that brokers object service request and reply messages over a communication transport external to the integrated circuit according to a defined protocol. The object service request messages comprise inbound data messages including one or more inbound operation names and object indicators and outbound data messages including one or more outbound operation names and object indicators. The object service reply messages comprising inbound data messages including object service request context information and outbound data messages including object service request context information. The router applies an outbound operation name directed from an application module for communication over the transport to the dispatch module to be transported in accordance with the protocol.

According to still another aspect of the preset invention, a reconfigurable filed programmable gate array comprises a plurality of middleware-enabled application blocks. Each middleware-enabled application block comprises one or more application modules that contain one or more application objects that use one or more application-specific interface indicators for processing messages. The one or more application-specific interface indicators associated with an application module of one application block are reconfigured while maintaining the one or more application-specific interface indicators associated with another application module of another application block.

BRIEF DESCRIPTION OF THE DRAWINGS

FIGS. 8(a) and 8(b) depict exemplary formats of the REQUEST_CONTROL and REPLY_CONTROL shown in FIGS. 6-7.

DETAILED DESCRIPTION OF THE INVENTION

Embodiments of the present invention are now disclosed with reference to the drawings. Although embodiments of this invention are depicted and described with reference to an FPGA, it must be understood that the present invention may be utilized in any integrated circuit such as Programmable Logic Devices (PLDs), Application Specific Integrated Circuits (ASICs), or in computing platforms based on technology other than semiconductor (e.g. optical computing). It must also be understood that although embodiments of the present invention describe a dispatcher as an ORB system implementing the CORBA standards, communications middleware systems and dispatchers implementing other standards may also be used with the method and system of the present invention.

One aspect of the invention relates to a communication system that transparently communicates messages between one or more hardware implemented application modules that send or otherwise transmit messages and one or more of hardware implemented hardware modules or software implemented application programs that receive the sent or otherwise transmitted messages.

Figure 2A:
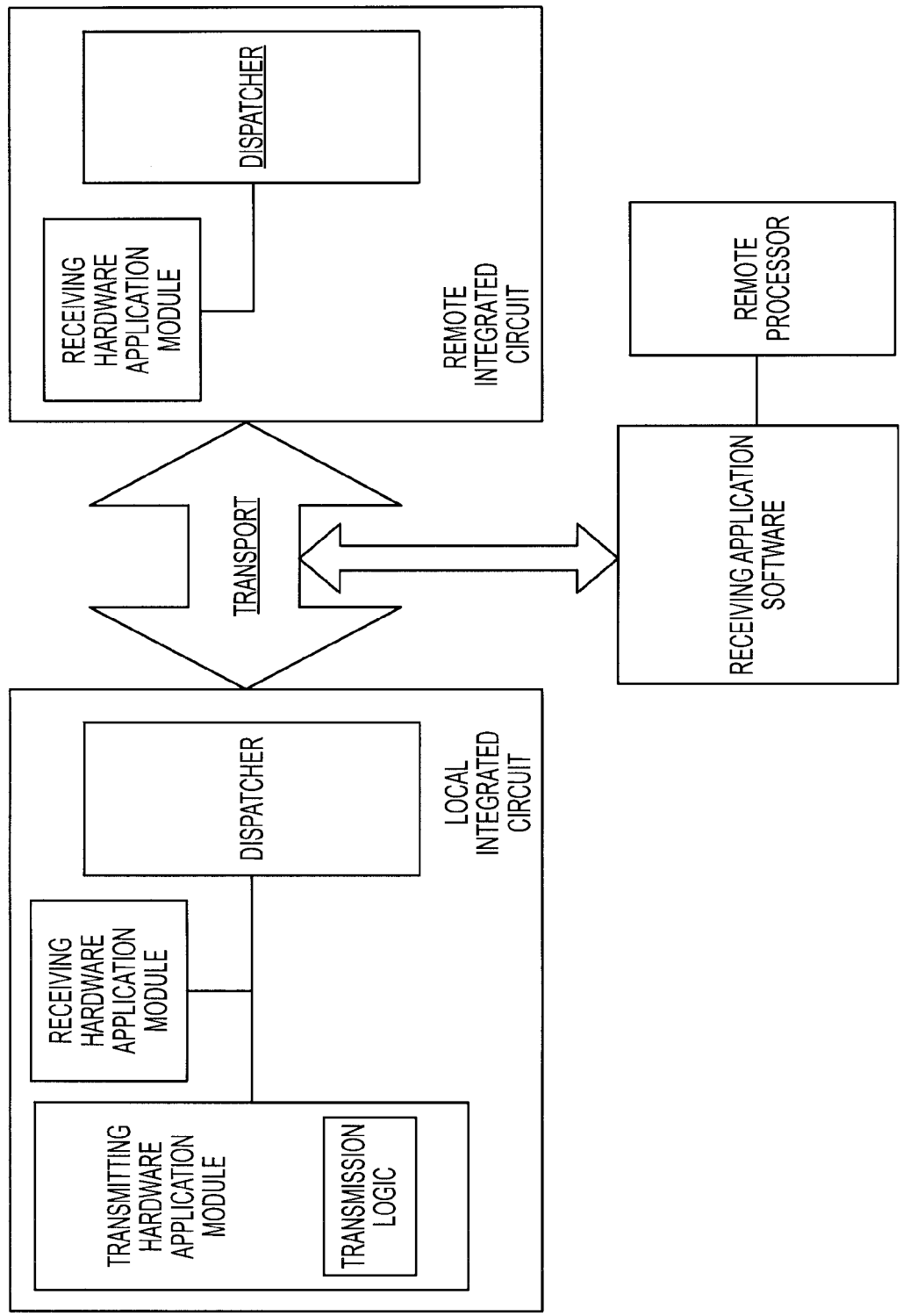
FIG. 2(a) is a block diagram for transparent communication of messages sent from a hardware implemented application module.
Figure 2B:
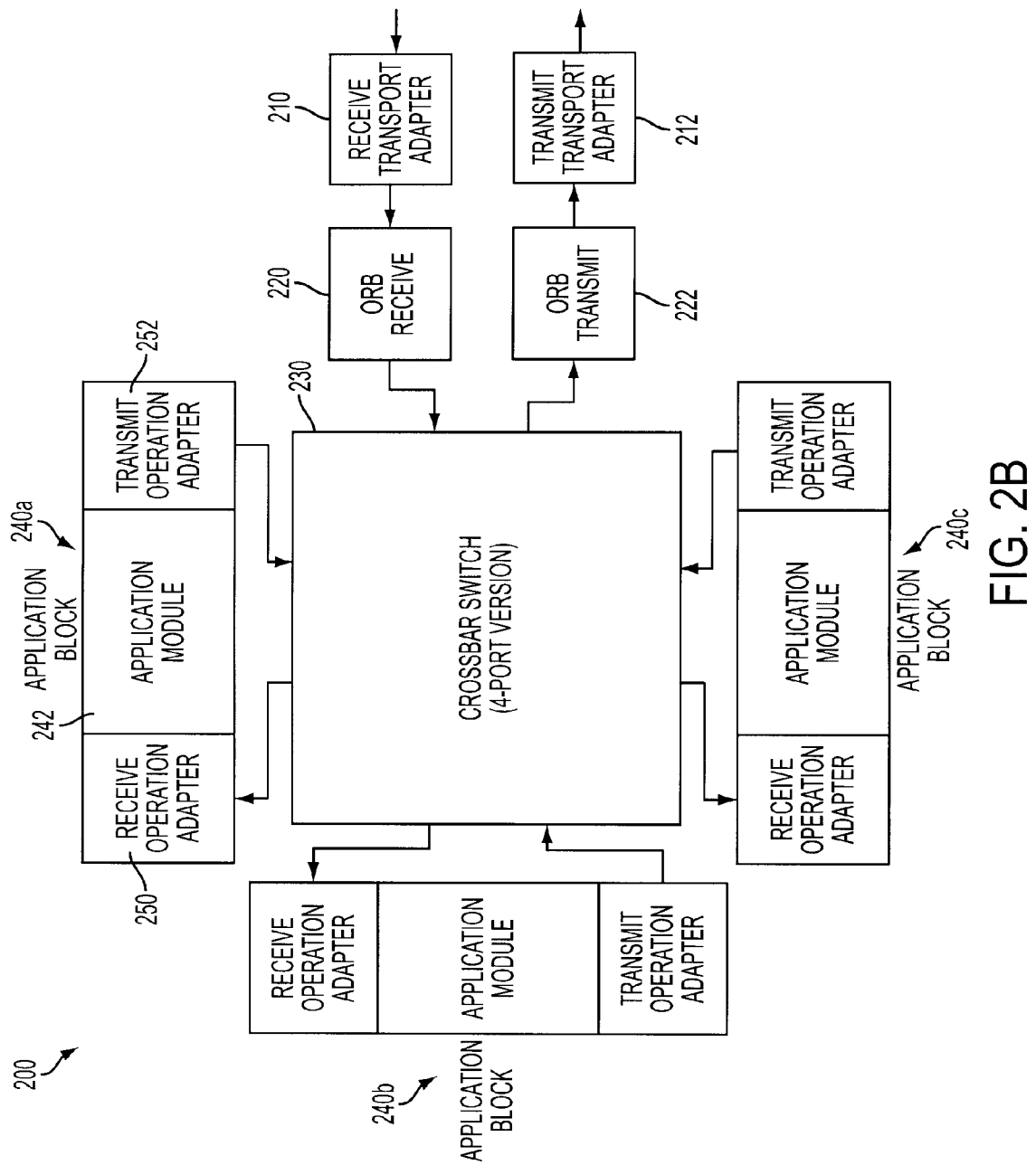
FIG. 2(b) depicts an embodiment of the present invention employing a crossbar switch

FIG. 2 (a) shows a system that provides messaging between a sending application hardware module on a local integrated circuit and a receiving application hardware modules or a receiving application software program according to this aspect of the present invention. The messaging transparency is provided by the sending application hardware module sending messages to a receiving application hardware module or a receiving application software program without the sending logic of such application hardware module having been constructed with a priori knowledge of the address of or the path to the receiving application hardware module or the application software program. In other words, the sending logic is constructed without any knowledge of the address of or the path to the receiving application hardware module or the application software program. So, when constructed initially no address of or the path to the receiving application hardware module or the application software program is embedded in the sending logic.

In one embodiment, the communication system provide inter-chip, namely communication transparency between one application hardware module and another application hardware module within an integrated circuit. Under this embodiment, the communication transparency is between a sending application hardware module and a receiving application hardware module both of which are located one the same local integrated circuit. The system of the present invention can also provide intra-chip communication transparency between the sending application hardware module in the local integrated circuit and a receiving application hardware module in a remote integrated circuit. In still another embodiment, the system of the present invention provides messaging transparency between the sending application hardware module on the local integrated circuit and the receiving application software programs that is executed on one or more remote processors, for example, on a client station or a communication node. Regardless, the sending logic of the sending application hardware modules on the local integrated circuit has no a priori knowledge of the address of or the path to the receiving application hardware module or the receiving application software program and communicates messages transparently.

In the communication system of the present invention, a hardware implemented dispatch module, such as a hardware implemented middleware compliant with an ORB protocol, brokers communication of messages. The dispatch logic is located on the integrated circuit that routes at least one or more of the messages sent or transmitted from the sending application hardware module on the local integrated circuit to one or more receiving application hardware modules on the same local integrated circuit. Alternatively, the dispatch logic routes messages transmitted from the sending application hardware module on the local integrated circuit for transport to either the receiving application hardware module located on the remote integrated circuit or the application software program run by the remote processor.

Referring now to FIG. 2 (*b*), there is depicted an embodiment of an FPGA system 200 according to the present invention. The FPGA comprises a plurality of application blocks 240*a*, 240*b*, etc., each having a corresponding application modules. Each application module comprises one or more application objects that perform a specified function using a corresponding interface and operation indicators, that can be numeric values or strings contained in messages. As shown, the application block 240*a*, for example, includes the application module 242, the Receive Operation Adapter (ROA) 250, and the Transmit Operation Adapter (TOA) 252. The ROA 250 and the TOA 252 interface with the application module 242 and act as a bridge between the application module 242 and a message router that routed inbound and outbound messages. In the exemplary FPGA of FIG. 2(*b*), the message router comprises a crossbar switch 230, which conveys messages within the FPGA locally, amongst the application blocks 240*a*, 240*b*, etc. The FPGA also conveys messages to remote destinations outside the FPGA over a transport through an ORB that comprises ORB Receive 220 and ORB Transmit 222. The ORB Receive 220 and ORB Transmit 222 are connected to an outside network through the Receive Transport Adapter (RTA) 210 and the Transmit Transport Adapter (TTA) 212, respectively. The Receive Transport Adapter (RTA) 210 and the Transmit Transport Adapter (TTA) 212 may encompass any type of communication port capable of transferring data in and out of the ORB, such as a PCI port, a USB port, an Ethernet port, a serial port, etc. Incoming messages are received by the RTA 210 and passed on to the ORB Receive 220. Outgoing messages are sent from the ORB Transmit 222 through the TTA 212 to the outside world. If multiple external communication ports are available to the FPGA, multiple interoperable ORBs, along with their associated RTA and TTA modules, can be instantiated.

The implementations of the ORB Receive 220 and the ORB Transmit 222 in the FPGA 200 are well known and can be placed anywhere in the FPGA 200 that the designer desires. The RTA 210 and the TTA 212, are typically custom-designed by the FPGA designer in accordance with the requirements of the application blocks 240*a*, 240*b*, etc. However, the type of port design used for the RTA 210 and the TTA 212 does not affect the ORB Receive 200 and ORB Transmit 222 modules, since the ORB Receive 200 and ORB Transmit 222 are independent and separate from the RTA 210 and the TTA 212.

The ORB Transmit 222 performs a similar function as the client ORB 124 and IDL Stubs 126 previously described with reference to FIG. 1. Similarly, the ORB Receive 220 performs a similar function to server ORB 134 and IDL Skeletons 136. When a request or reply is generated by an application module within the FPGA 200, the ORB Transmit 222 creates GIOP messages, which are then sent out, through the TTA 212, to a remote destination ORB, for example to the dispatcher in the remote integrated circuit of FIG. 1.

Figure 1:
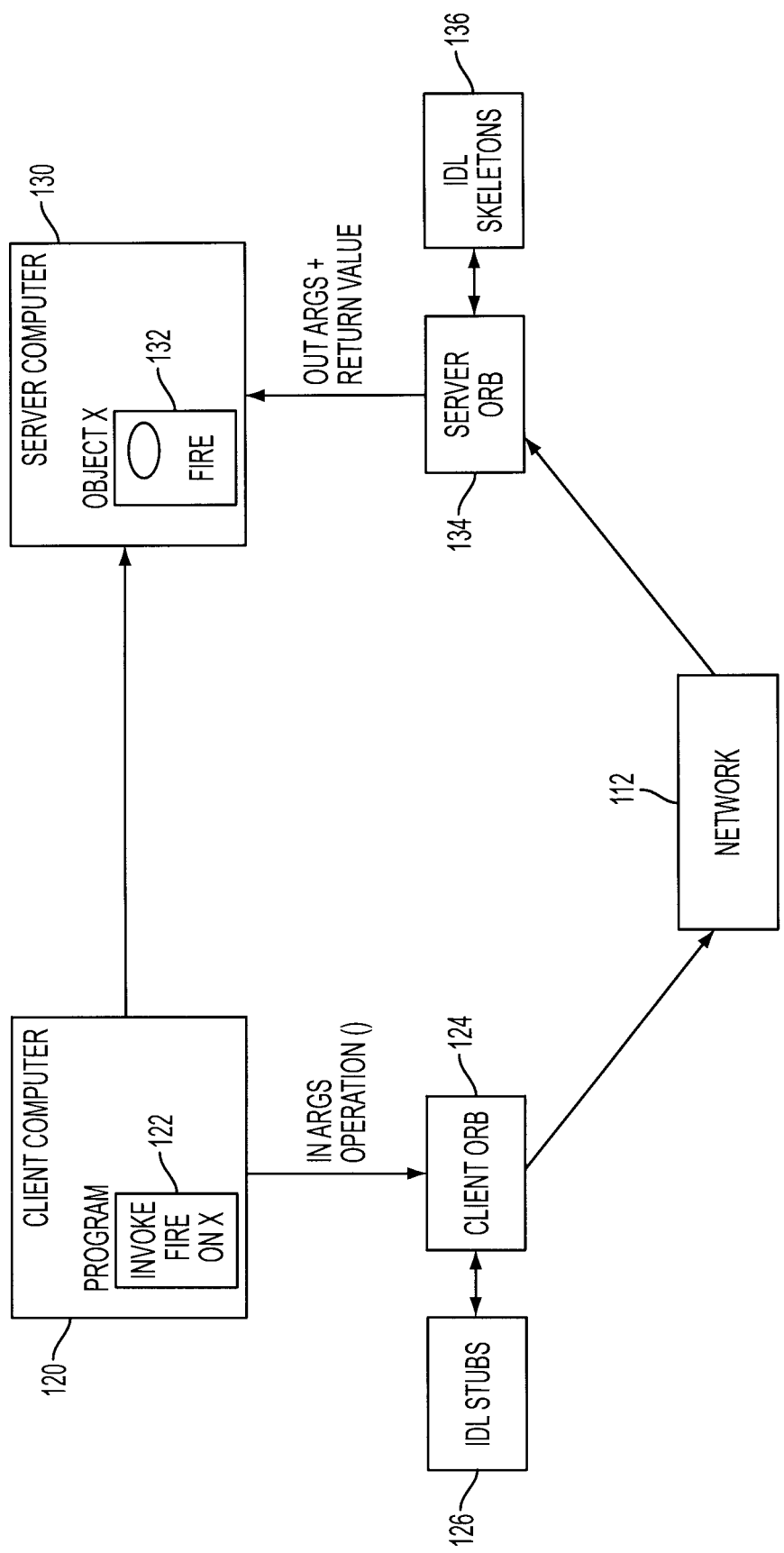
FIG. 1 depicts a conventional ORB model connecting a client computer to a server computer within a network.

When a request is sent from an external or otherwise remote ORB to the FPGA 200, e.g., a request from the dispatcher in the remote integrated circuit of FIG. 1, the ORB Receive 220 transforms the GIOP packets into a compact internal representation that can then be readily processed within the FPGA. As further described below, all application blocks 240*a*, 240*b*, etc., within the FPGA process messages in the same manner regardless f whether a message is originated locally from another application block within the FPGA or originated remotely from outside of the FPGA. The compact internal representation includes a string-based 'operation name', which is operation that an application module 242 on the FPGA 200 has been requested to perform, along with the necessary parameters.

In addition to the ORB Receive 220 and the ORB Transmit 222, the ORB functionality may also include the cross bar switch 230. Alternatively, the designer may choose to implement their own cross bar switch 230. The crossbar switch 230 can be placed in any part of the FPGA 200 as long as it can connect the ORB Receive 220 and the ORB Transmit 222 to all application blocks 240*a*, 240*b*, etc. that the ORB needs to communicate with. The exemplary embodiment in FIG. 2 depicts a 4-port crossbar switch 230 connected the ORB Receive 220 and the ORB Transmit 222 to a plurality of application blocks 240*a*, 240*b*, and 240*c*. However, it is possible to use a variety of other switches such as partially-connected crossbars, fully-connected crossbars, banyan switches, memory switches, etc. It is also possible to include any number of ports on the switch 230 depending on the number of application blocks on the FPGA. Further, more than one ORB may be included in the FPGA, in which case each ORB would be designated a port on the switch 230. In FIG. 2(*b*), the ORB Receive 220 and ORB Transmit 222 may be connected to port '00', the application block 240*a* may be connected to port '01', the application block 240*b* may be connected to port '10', and the application block 240*c* may be connected to port '11' and so on.

As stated above, each middleware-enabled application block such as application block 240*a*, a Receive Operation Adapter (ROA) 250, a Transmit Operation Adapter (TOA) 252, which act as a bridge between the application module 242 and the crossbar switch 230. A transmit operation adapter associated with each middleware application block transmits one or more outbound operation names and object indicators. A receive operation adapter associated with each middleware application block receives inbound operation names and object indicators. Each receive operation adapter of a middleware-enabled application block converts at least one inbound operation name based on the inbound object indicator to a corresponding application-specific operation indicator for use by an application object of a corresponding application module specified by the object indicator. Each transmit operation adapter of a middleware-enabled application block converts at least one application-specific operation indicator specified by an application object of a corresponding application module to a corresponding outbound operation name. An operation name from a transmit operation adapter in one application block is conveyed to a receive operation adapter of another application block based on an object indicator from said transmit operation adapter.

In the exemplary embodiment of FIG. 2 (b), the ROA 250 includes a look up table containing operation names and corresponding enumerated operation indicator values. An operation name is a string of characters and constitutes what is known to the outside world as a command that an application module such as application module 242, is able to execute. For example, an operation name can be "fire", "reload", or "shut down". The application module 242 is configured to recognize enumerated operation indicator values associated with that operation names as a function. For example, the enumerated operation indicator value for "fire" may be 0, the enumerated operation indicator value for "reload" may be 1, and the enumerated operation indicator value for "shut down" may be 2. The enumerated operation indicator values are unique to a particular application module and application objects contained therein. Therefore, while the 0 may be associated with "fire" within the application block 240a, it may be associated with another operation such as "measure temperature" in application block 240b. Because the look up table is contained in the ROA 250, and is therefore directly associated with the application module 242, the application can be dynamically reconfigured without impacting the rest of the system and without requiring additional external configuration effort.

The TOA 252 includes a set of tables used to convert enumerated operation indicator values for operation names and enumerated object indicator values for object keys into, respectively, fully expanded strings and octet sequences. Once again, because this data is contained in the TOA 252, and is therefore directly associated with the application module 242, the application can be dynamically reconfigured without impacting the rest of the system.

During the implementation of the FPGA 200, the ROA 250 and the TOA 252 are generated from an IDL model using an IDL-to-VHDL compiler. The IDL model describes the content of the ROA 250 and the TOA 252. Within the IDL model, there are entries for each every operation supported by application objects of the application module 242, which include the enumerated operation indicator value, the operation name, and a list of parameters for each operation. To configure and create an IDL model for an application block 240, a systems architect needs only to modify the operation names and parameters for each operation. Therefore, creating the IDL model does not require a designer to have a thorough understanding of IDL programming. Thus, a reconfigurable FPGA according to the present invention has a plurality of middleware-enabled application blocks having one or more application objects that use one or more application-specific interface indicators, such as values or strings. The application-specific interface indicators are describe by a hardware defined language, e.g., VHDL, that implements each application block on the FPGA. According to this aspect of the invention, an application-specific indicator associated with one application block can be modified, updated or reconfigured dynamically without having to modify any other description of the hardware defined language that implements any other application block.

In additional to generating VHDL code for the ROA 250 and TOA 252, the IDL compiler generates documentation describing, in detail, the format and location of all Operation data elements within the GIOP message payload. This reduces or eliminates the need for the FPGA designer to become familiar with GIOP message formats and Common Data Representation (CDR) marshalling/demarshalling rules.

The IDL-to-VHDL compiler compiles the IDL model into VHDL code that will be used to synthesize the ROA 250 and the TOA 252 for each application block 240a, 240b and 240c. Since the ROA 250 and TOA 252 are generated independently from all the other ORB modules previously described, an FPGA designer may reconfigure any application block 240a, 240b or 240c of the FPGA 200 without having to reprogram and reconfigure the other ORB modules. Therefore, for example, if application module 242 within the application block 240a needs to be updated or modified, the systems architect needs only to create a new IDL model for the new application module 242 and run the IDL-to-VHDL compiler to create new ROA 250 and TOA 252 for the application block 240. However, the ORB Receive 220, the ORB Transmit 222, the RTA 210, the TTA 212, and the crossbar switch 230 need not be modified.

During the operation of the FPGA, when a GIOP request packet is received by the RTA 210, the packet is passed on to the ORB Receive 220. The ORB Receive 220 process and reformats the message header to create a compact internal representation that is optimized for stream processing. The optimized header will include, among other information, an operation name in the form of a string, the message data which includes the parameters for the desired operation, and an object key, which includes designates the destination address of the packet. The destination address corresponds to the application block where the packet is to be sent. The data packet is then sent the crossbar switch 230.

The switch 230 routes the packet that it receives from the ORB Receive 220 to the destined application block 240a. The incoming packets are processed by the ROA 250 before being sent to the application module 242. The object indicator bits [5:0] of the object key indicates the appropriate interface for each application object in the application module. As previously described, the ROA 250 contains a look up table for converting the string operation names appropriate for the target object's interface to enumerated operation indicator values. If the message received at the ROA 250 originated from the ORB Receive 250, the message will include an operation name in the form of a string. In that case, the ROA 250 looks up the operation name and coverts it into a corresponding enumerated value. The ROA 250 then passes the packet on to the application block 240. If, however, the packet is routed from another application block 240b to the application block 240a, the packet would already include the enumerated value. In that case, the ROA 250 passes on the packet to the application module 242 without modification. This behavior isolates the FPGA application from knowledge regarding the internal or external origin of a message, providing location transparency.

If the operation requires a reply, the application module 242 will generate a reply message and send it to the crossbar switch 230 through the TOA 252. The message is then sent from the crossbar switch 230 to the ORB transmit module 222, which generates a complete GIOP message. The GIOP message is then sent out through the TTA 212. Requests initiated by the application blocks 240 are similarly transferred.

In another embodiment of the present invention, the task of the TOA 252 is limited to sending information to the ORB Receive 220 and ORB Transmit 222 at boot time. In this embodiment, the data sent by the TOA 252 to the ORB Transmit 222 at boot time includes information about how to convert the enumerated operation indicator values back into string operation names. Therefore, in this embodiment, the ORB Transmit will have to include a storage means for storing the enumerated operation indicator values associates with each operation that will be invoked by each application block 240a. At operation time, every time the application module 242 initiates a request message or sends a reply message to the ORB Transmit 222, the TOA 222 transmits the message through without any modification. Therefore, the message received by the ORB Transmit 222 will include the enumerated operation indicator values instead of the operation names. The ORB transmit 222 then translates the enumerated types to operation names before creating the GIOP message.

Figure 3:
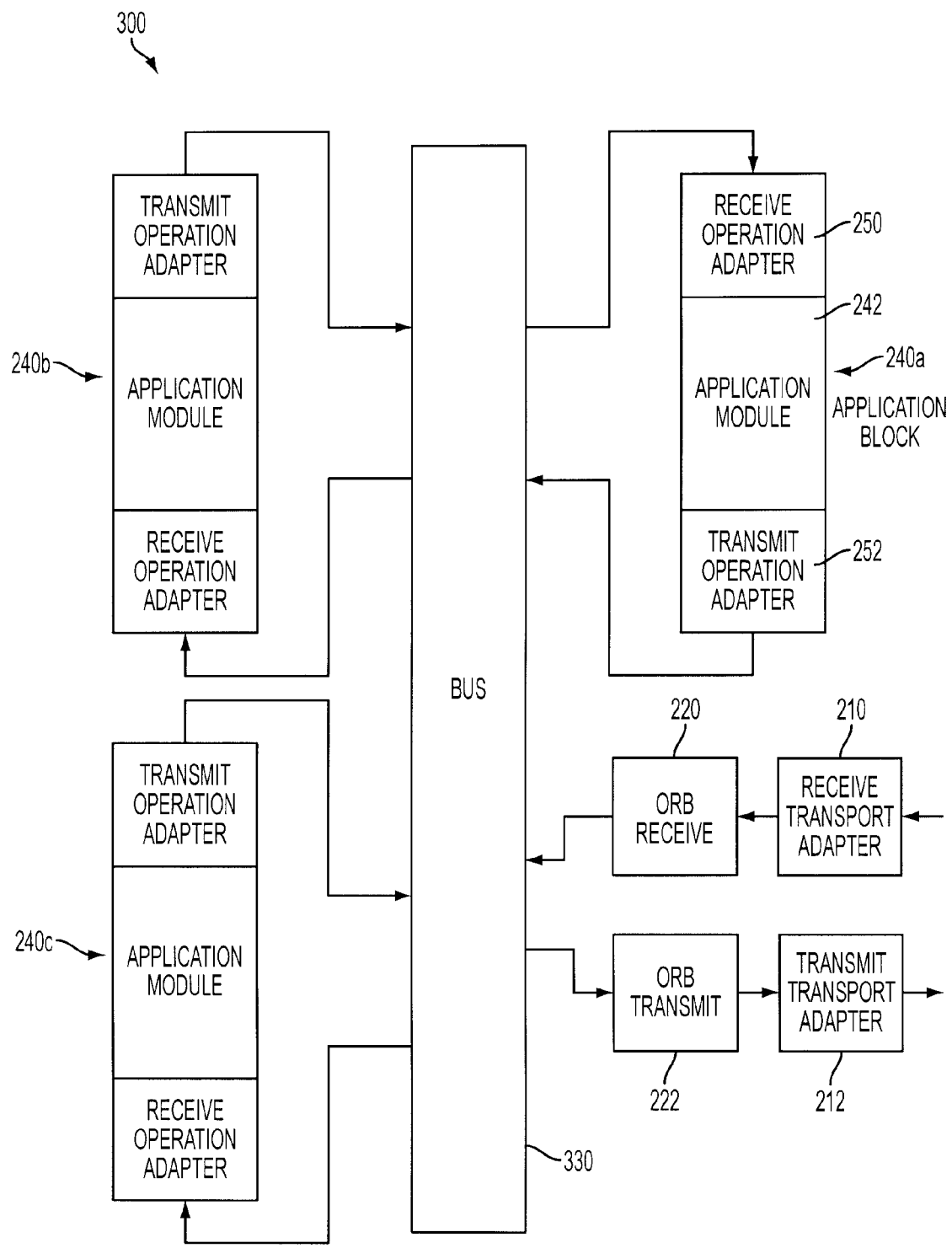
FIG. 3 depicts an embodiment of the present invention employing an internal BUS.

FIG. 3 depicts an alternative embodiment of the present invention employing a router in the form of a bus 330 instead of a switch. In this embodiment, the ORB Receive 220 sends messages to the BUS 330, which will deliver messages to the destination application block 240a using the address information in the message header.

Figure 4:
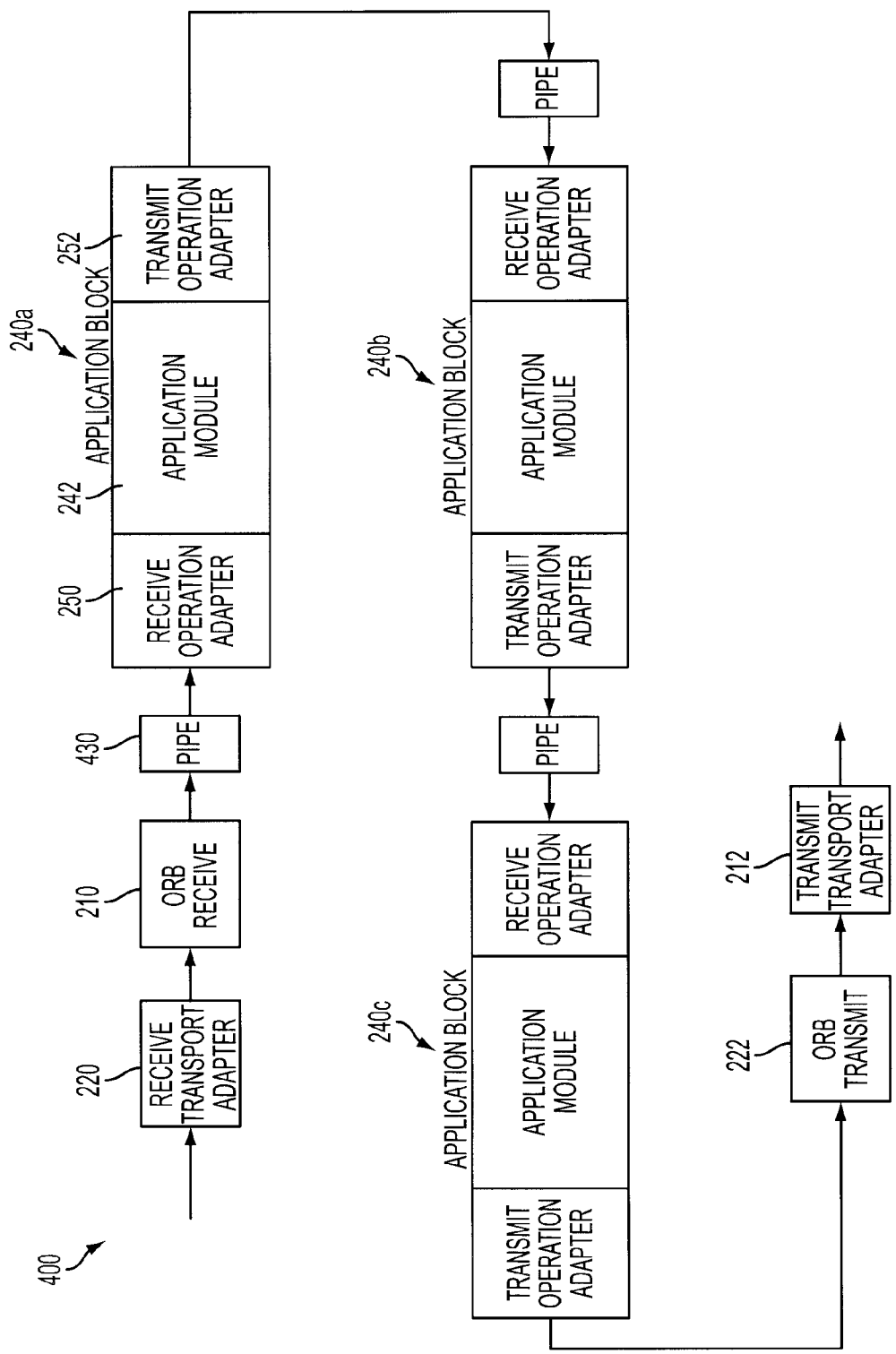
FIG. 4 depicts an embodiment of the present invention employing direct routing.

FIG. 4 depicts yet another embodiment of the present invention wherein messages between all application blocks 440 are routed serially. In this embodiment, the ORB Receive 210 sends a message through a series of application blocks until the desired application block to which the message has been addressed receives and processes the message. Thereafter, the application block may issue a reply, which may again go through a series of other applications before being received by the ORB transmit 222. In order to increase throughput, all connections may be pipelined using pipes 430. Accordingly, the ORB Receive 210 may issue different requests to the initial application block at each clock cycle, instead of having to wait for a reply to come back before issuing a new request. Alternatively, the series of application blocks 440 may be connected without pipelining.

Figure 5:
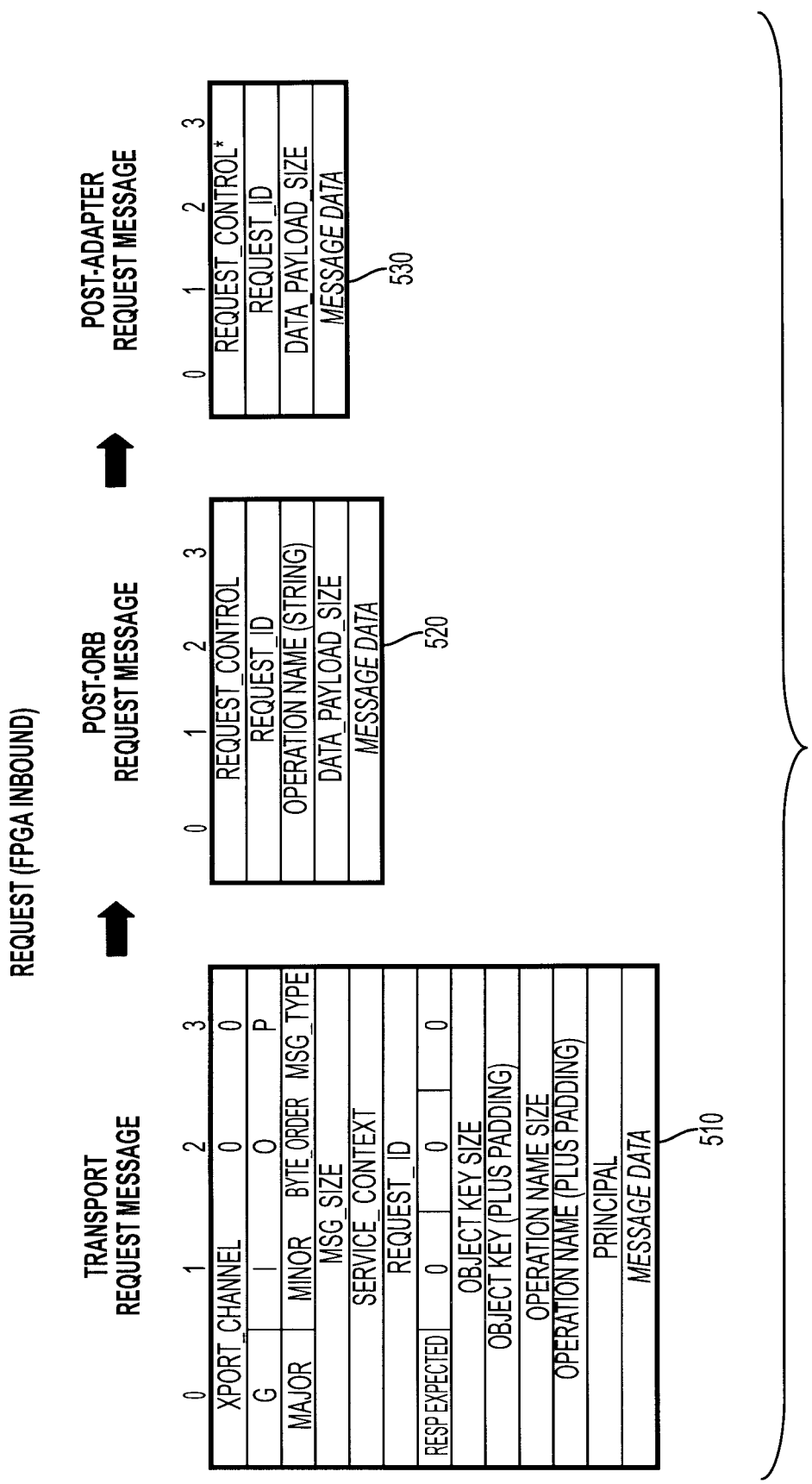
FIG. 5 depicts an exemplary format an inbound request message processed through the ORB and the Receive Operation Adapter.

FIG. 5 depicts an exemplary format an inbound request message processed through the ORB and the ROA. The Transport Request Message 520 is a GIOP message having fields required by the GIOP standard. Since most these fields are not necessary for the operation of an internal FPGA application, the ORB reduces the message 520 to a Post-ORB Request Message 530. The message 530 includes the operation name as a string, which, in the example previously provided, may be "fire", "reload", "shut_down" or "measure temperature". The message 530 also includes a REQUEST_CONTROL, which will be described later with reference to FIG. 8a, as well as a request_id, a data_payload_size, and message data. The message data includes the parameters that are sent to the application to execute the specific operation.

Figure 6:
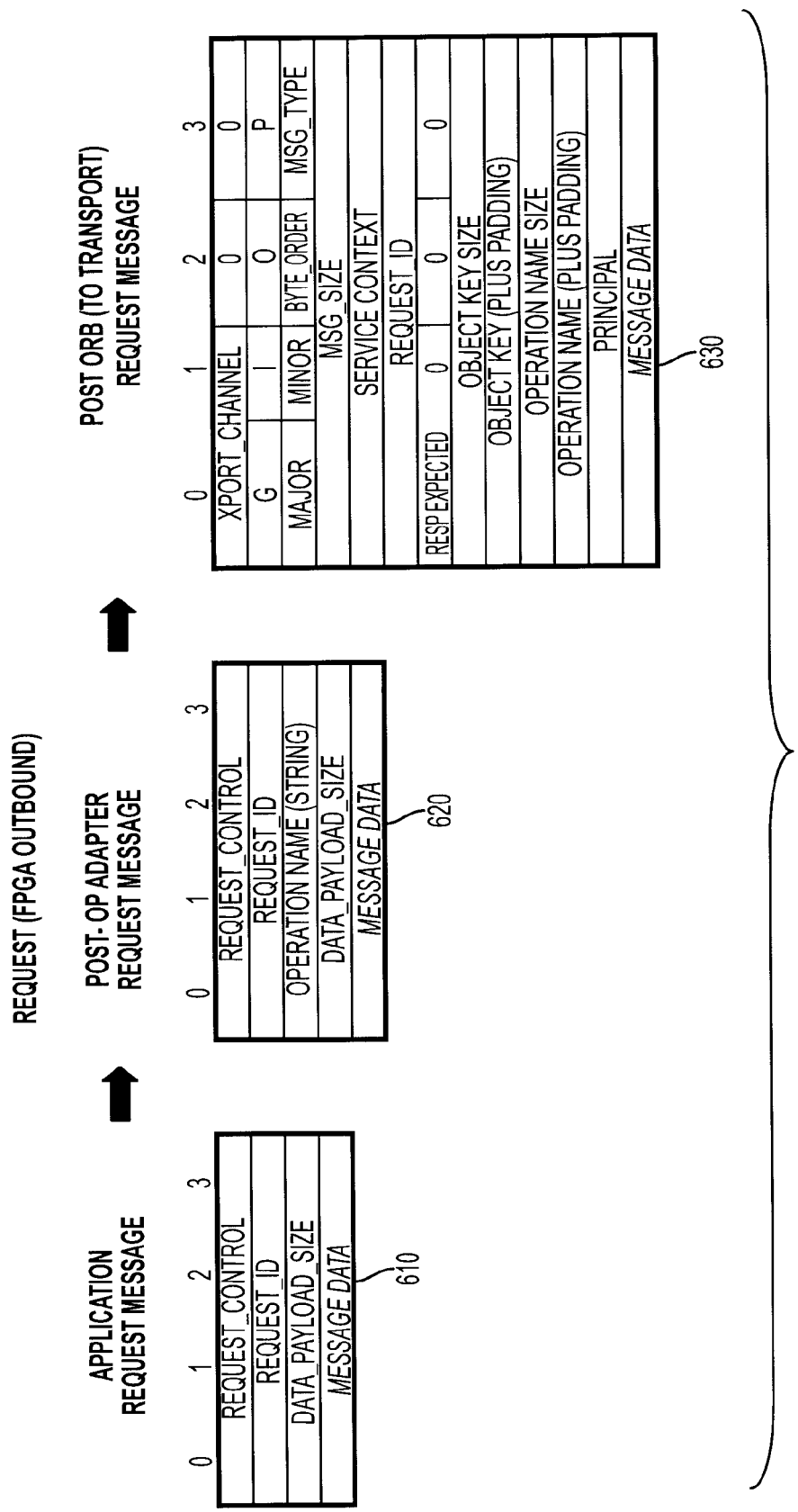
FIG. 6 depicts an exemplary format of an outbound request message processed through the Transmit Operation Adapter and the ORB.

FIG. 6 depicts an exemplary format of an outbound request message processed through the Operational Transmit Adapter and the ORB. An Application Request Message 610 is received by the Operation Transmit Adapter, which looks up the operation name (string) for the desired operation enumerated value and adds the operation name to the message 620. The message 620 is then converted by the ORB to Port ORB (To Transport) Request Message 630, which conforms to the GIOP standards.

Figure 7:
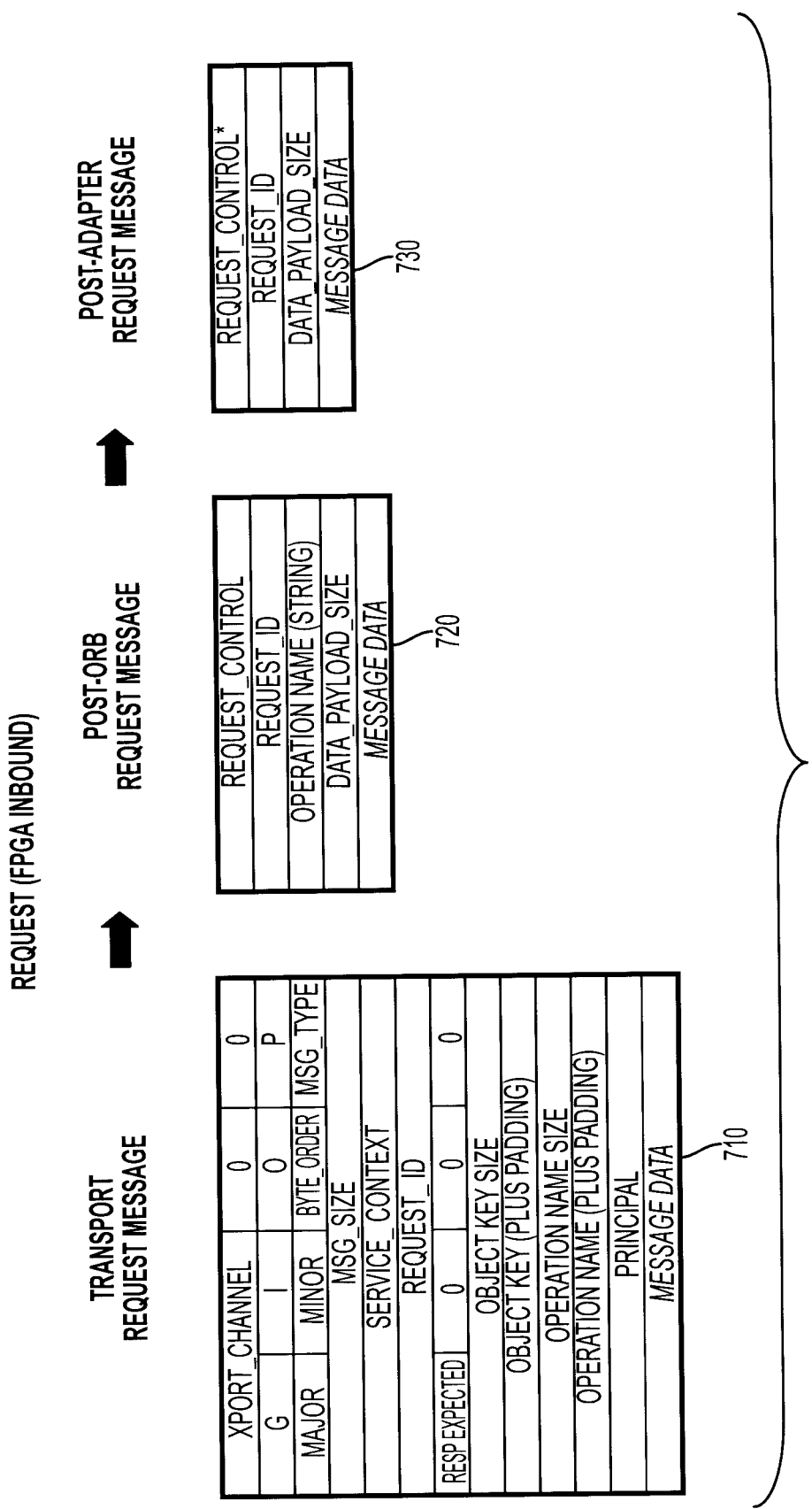
FIG. 7 depicts an exemplary format of a reply message processed through the Transmit Operation Adapter and the ORB.

FIG. 7 depicts an exemplary format of a reply message processed through the Operational Transmit Adapter and the ORB. The Application Reply Message 710 is similar to the Application Request Message 610 shown in FIG. 6, except that it includes a REPLY_CONTROL instead of a REQUEST_CONTROL. Similarly, the Post-Op Adapter Reply Message 720 is similar to the Post-Op Adapter Request Message 620, except that it includes a REPLY_CONTROL.

FIGS. 8 (a) and 8 (b) depict exemplary formats of the REQUEST_CONTROL and REPLY_CONTROL shown in FIGS. 6-7, which are both 32-bit fields. The field description of REQUEST_CONTROL and REPLY_CONTROL are provided as follows.

Figure 9:
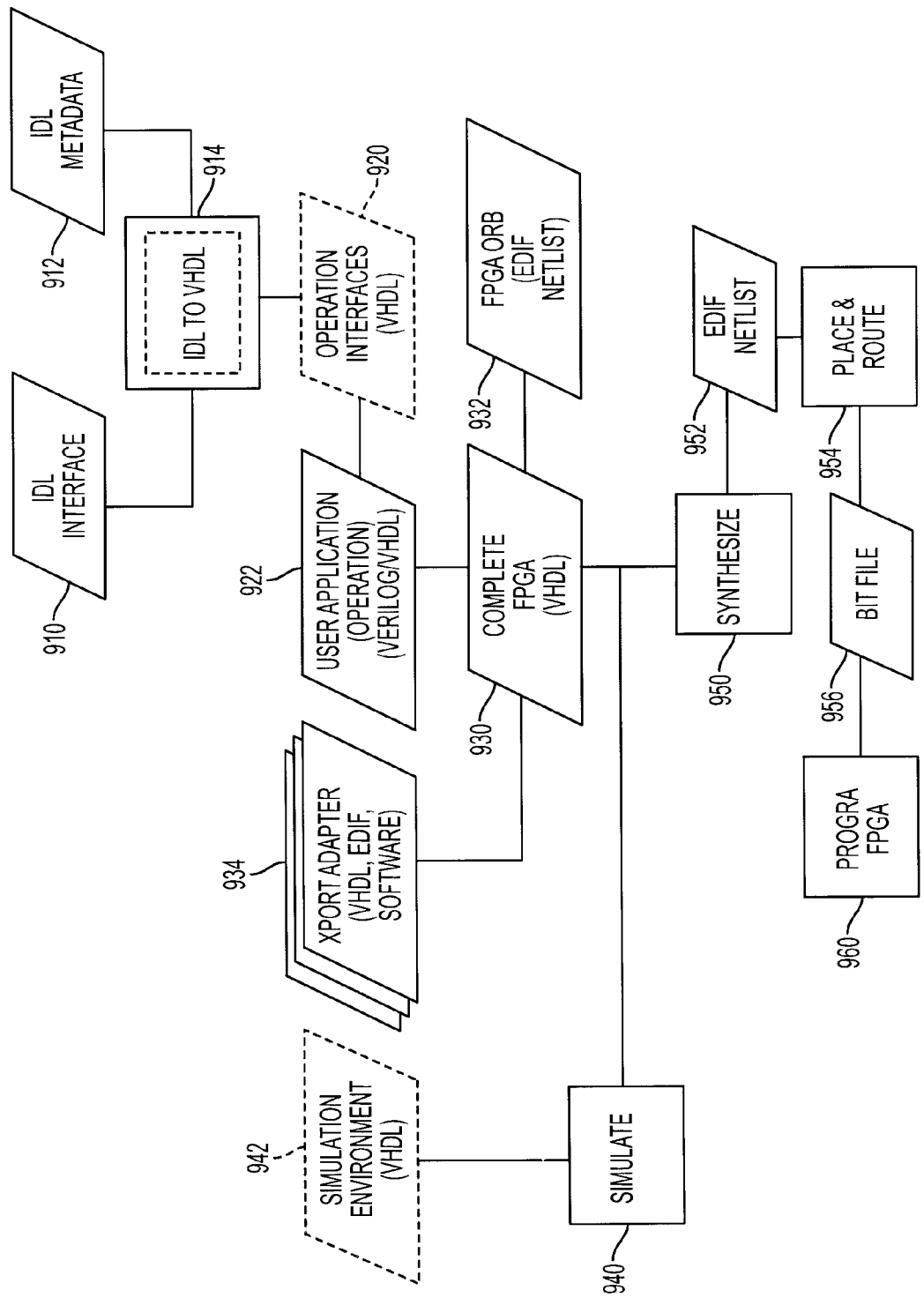
FIG. 9 depicts a flow chart of the method of implementing an FPGA having an ORB according to embodiments of the present application.

REQUEST CONTROL Field Description
Destination Object Address
 Bits [10:6] indicate the internal physical destination for the message. For outgoing Request messages these bits are set to the transmit ORB adapter (all zeros). For incoming and local Request messages these bits are set to the target Operation adapter.
 Bits [5:0] indicate the internal logical destination within the physical destination for the message. For incoming, local, or outgoing Request messages these bits are set to the a value appropriate to indicate the Object Id for the servant invoked upon.
Source Object Address
 Bits [10:6] indicate the internal physical source of the message. For incoming Request messages these bits are set to the receive ORB adapter (all zeros). For outgoing and local Request messages these bits are set to the source Operation adapter.
 Bits [5:0] indicate the internal logical source within the physical source of the message. For incoming, local, or outgoing Request messages these bits are set to the a value appropriate to indicate the Object Id for the invoking servant.
Byte Order—CORBA-defined Boolean value indicating byte ordering for incoming message.
 1=Little Endian, 0=Big Endian
Message Type (MT)—Message Type field indicator Boolean value.
 0=Request, 1=Reply
Response Expected (RE)—CORBA-defined Boolean value indicating if a response is
 expected to this request. 0=No Response Expected, 1=Response Expected
Enumerated Operation
 Operation adapters interpret this as an enumerated operation indicator.
REPLY CONTROL Field Description
Destination Object Address
 Bits [10:6] indicate the internal physical destination for the message. For outgoing Reply messages these bits are set to the transmit ORB adapter (all zeros). For incoming and local Reply messages these bits are set to the target Operation adapter.
 Bits [5:0] indicate the internal logical destination within the physical destination for the message. For incoming, local, or outgoing Reply messages these bits are set to the a value appropriate to indicate the Object Id for the invoking client servant.
Source Object Address
 Bits [10:6] indicate the internal physical source of the message. For incoming Reply messages these bits are set to the receive ORB adapter (all zeros). For outgoing and local Reply messages these bits are set to the source Operation adapter.
 Bits [5:0] indicate the internal logical source within the physical source of the message. For incoming, local, or outgoing Reply messages these bits are set to the a value appropriate to indicate the Object Id for the servant invoked upon.
Byte Order—CORBA-defined byte ordering for incoming message.
 1=Little Endian, 0=Big Endian
Message Type (MT)—Message Type field indicator Boolean value.
 0=Request, 1=Reply. Must be Reply (b "1").
Reply Status (RS)—CORBA-defined. Should typically be NO_EXCEPTION
 (b "000")
FIG. 9 depicts a flow chart of the method of implementing an FPGA having an ORB or ORBs according to embodiments of the present application. The IDL Interface 910 and IDL Metadata 912 are provided to the IDL to VHDL compiler, block 914. The IDL to VHDL compiler uses the data to generate the necessary operation interfaces for each application in VHDL, block 920. Thereafter, the operation interfaces merge with the user applications to create the application blocks in VHDL or Verilog, block 922. The application blocks then combine with the FPGA ORB 932, which is in an EDIF Netlist format, and the Transport Adapters models 934, which are in VHDL, EDIF, or software format, to complete the VHDL model of the FPGA, block 930. The VHDL model is then simulated using the simulation environment 942 provided in VHDL, block 940. After successful simulation, the VHDL model of the FPGA is synthesized, block 950, to create en EDIF Netlist, block 952. The EDIF Netlist can then be placed on and routed through the FPGA, block 954. Finally, a bit file is created, block 956, which is used to program the FPGA, block 960.

Figure 10:
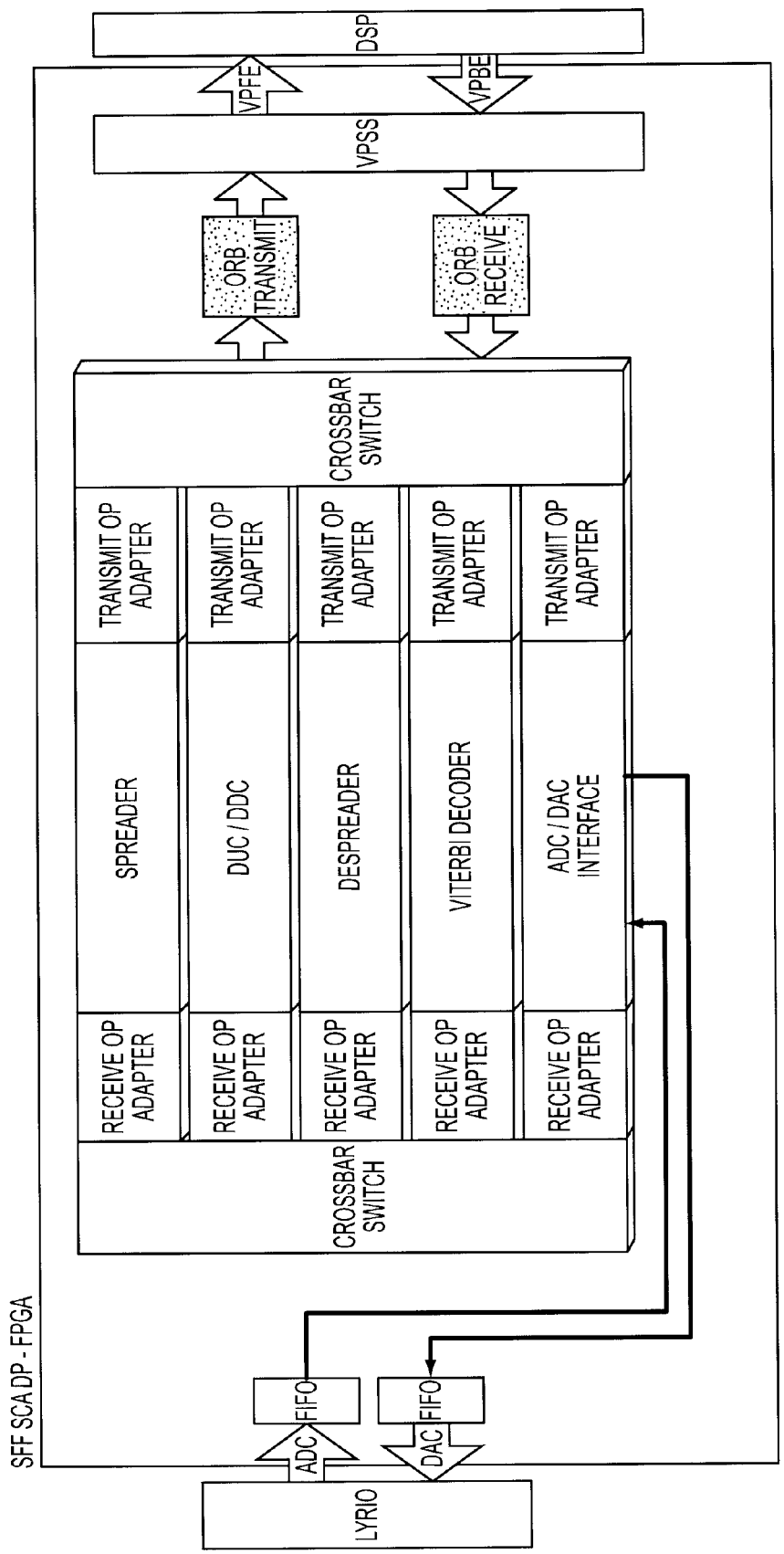
FIG. 10 depicts an example an FPGA having an ORB according to embodiments of the present invention.

FIG. 10 depicts an exemplary block diagram of a software defiled radio (SDR) implemented according to the embodiments of the present invention. The SDR is implemented on an integrated circuit, such as an FPGA, with a plurality of middleware-enabled application blocks, such as a spreader block, a despreader block, an encoder block and DAC/ADC blocks etc. Each middleware-enabled application block comprise one or more application modules, that contain one or more application objects that perform the necessary SDR functions, including signal spreading, dispreading, encoding and A/D and D/A conversion functions, etc. These application objects use corresponding application-specific interface indicators for processing messages transparently, as described above, within the integrated circuit locally and without the integrated circuit remotely over a transport.

As shown, a transmit operation adapter and a receive operation adapter is associated with each middleware application block for communicating inbound and outbound messages and processing/converting operation names and object indicators as described above. Each receive operation adapter of a middleware-enabled application block converts at least one inbound operation name based on the inbound object indicator to a corresponding application-specific operation indicator for use by an application object of a corresponding application module specified by the object indicator. Each transmit operation adapter of a middleware-enabled application block converts at least one application-specific operation indicator specified by an application object of a corresponding application module to a corresponding outbound operation name. A message router in the form of a cross bar switch conveys the messages within the integrated circuit between the application blocks locally. A dispatch module, comprising ORB receive and ORB transmit blocks, is coupled to the message router that brokers object service request and reply messages over a communication transport external to the integrated circuit according to a defined protocol, such as CORBA. The object service request messages comprise inbound data messages including one or more inbound operation names and object indicators and outbound data messages including one or more outbound operation names and object indicators. The object service reply messages comprise inbound data messages including object service request context information and outbound data messages including object service request context information. The message router applies an outbound operation name directed from an application module for communication over the transport to the dispatch module to be transported in accordance with the protocol.

As stated above, the present invention allows for partial and dynamic reconfigurability of the FPGA that implements the SDR application blocks such that each application block can be reconfigured without impacting any other application block. For example, the spreader block interfaces can be updated or modified without having to reconfigure any other SDR functional block. Thus, the FPGA that implements the SDR is a reconfigurable filed programmable gate array that comprises a plurality of middleware-enabled application blocks, namely, the spreader, despreader, encoder, DAC/ADC blocks etc. Each middleware-enabled application block has one or more application objects that perform SDR-related functions. They use one or more application-specific interface indicators for processing messages. The one or more application-specific interface indicators associated with one application block can be dynamically reconfigured or modified without modifying the one or more application-specific interface indicators associated with another application block.

The invention claimed is:

1. An integrated circuit, comprising:
a plurality of middleware-enabled application blocks, each middleware-enabled application block comprising:
one or more application modules that contain one or more application objects that use one or more application-specific interface indicators for processing messages;
a transmit operation adapter that transmits one or more outbound operation names and object indicators; and
a receive operation adapter that receives the one or more inbound operation names and object indicators;
wherein each receive operation adapter of a middleware-enabled application block converts at least one inbound operation name based on the inbound object indicator to a corresponding application-specific operation indicator for use by an application object of a corresponding application module as specified by the object indicator,
wherein each transmit operation adapter of a middleware-enabled application block converts at least one application-specific operation indicator specified by an application object of an application module to a corresponding outbound operation name, and
wherein an operation name from the transmit operation adapter in one application block is conveyed to the receive operation adapter of another application block based on an object indicator from said transmit operation adapter.

2. The integrated circuit of claim 1 further including a message router that conveys one or more messages each containing an optional operation name, an optional object indicator, and other data from the plurality of middleware-enabled application blocks and directs the one or more outbound operation names and object indicators to the plurality of the middleware-enabled application blocks.

3. The integrated circuit of claim 2 further including a dispatch module coupled to the message router that brokers object service request and reply messages over a communication transport external to the integrated circuit according to a defined protocol, said object service request messages comprising inbound data messages including the one or more inbound operation names and object indicators and outbound data messages including the one or more outbound operation names and object indicators, and said object service reply messages comprising inbound data messages including object service request context information and outbound data messages including object service request context information.

4. The integrated circuit of claim 3, wherein the defined protocol comprises an Object Request Broker (ORB) protocol.

5. The integrated circuit of claim 1, wherein each receive operation adaptor comprises a look up table for mapping one or more inbound operation names to one or more application specific interface values.

6. The integrated circuit of claim 1, wherein each transmit operation adaptor comprises a look up table for mapping one or more application specific interface values to one or more outbound operation names.

7. The integrated circuit of claim 1, wherein the plurality of application blocks are integrated on a circuit in accordance with an integrated circuit technology, comprising at least one of a Field Programmable Gate Array (FPGA), Programmable Logic Device (PLD) or Application-Specific Integrated Circuit (ASIC).

8. The integrated circuit of claim 3, wherein an inbound data packet associates an inbound operation name with a request for service.

9. The integrated circuit of claim 3, wherein an outbound data packet associates an outbound operation name with a request for service or a reply to a request for service.

10. The integrated circuit of claim 2, wherein said message router comprises at least one of a switch or a bus.

11. The integrated circuit of claim 10, where in said switch comprises at least one of a partially connected crossbar switch, a fully connected crossbar switch, a banyan switch, or a memory switch.

12. The integrated circuit of claim 2, wherein said message router couples a plurality of application modules to one another in series.

13. The integrated circuit of claim 12, wherein said router pipelines inbound and outbound requests through the plurality of serially coupled application modules to one of said plurality of operation adapters.

14. The integrated circuit of claim 4, wherein said ORB protocol comprises a General Inter-ORB Protocol (GIOP).

15. The integrated circuit of claim 1, wherein an application-specific indicator associated with one application block is modified dynamically without modifying any other application block.

* * * * *